United States Patent
Kim et al.

(10) Patent No.: US 6,501,222 B1
(45) Date of Patent: Dec. 31, 2002

(54) APPARATUS FOR AUTOMATICALLY CORRECTING FOR EARTH MAGNETIC FIELD EFFECTS ON A MONITOR

(75) Inventors: Kyung Sic Kim, Kumi (KR); Jin Sik Kim, Daeku (KR)

(73) Assignee: LG Electronics (KR)

( * ) Notice: Subject to any disclaimer, the term of this patent is extended or adjusted under 35 U.S.C. 154(b) by 0 days.

(21) Appl. No.: 09/427,253

(22) Filed: Oct. 26, 1999

(30) Foreign Application Priority Data

Nov. 19, 1998 (KR) .......................................... 98-49798

(51) Int. Cl.⁷ ................................................ H01J 29/54
(52) U.S. Cl. ........................................... 315/8; 315/370
(58) Field of Search ....................... 315/8, 370

(56) References Cited

U.S. PATENT DOCUMENTS

| | | | |
|---|---|---|---|
| 4,305,034 A | 12/1981 | Long et al. | |
| 4,593,332 A | 6/1986 | Akiyama et al. | |
| 4,851,775 A | 7/1989 | Kim et al. | |
| 5,066,891 A | 11/1991 | Harrold et al. | |
| 5,583,401 A | * 12/1996 | Inoue et al. | 315/370 |
| 5,614,791 A | 3/1997 | Kume et al. | |
| 6,130,505 A | * 10/2000 | Webb et al. | 315/8 |

FOREIGN PATENT DOCUMENTS

| | | |
|---|---|---|
| EP | 0396381 | 11/1990 |
| EP | 0657913 | 6/1995 |
| JP | 9524598 | 8/1995 |
| JP | 9616849 | 12/1996 |
| WO | 9310467 | 5/1993 |
| WO | 9835373 | 8/1993 |
| WO | WO9832278 | 7/1998 |
| WO | 9832278 | 7/1998 |

\* cited by examiner

*Primary Examiner*—David Vu
(74) *Attorney, Agent, or Firm*—Ostrolenk, Faber, Gerb & Soffen, LLP (57) ABSTRACT

An apparatus for automatically correcting an earth magnetic field for a monitor includes: a peripheral magnetic field sensing unit for sensing a variation in a magnetic field and generating a corresponding frequency; a frequency producing unit for arithmetically operating the frequency generated from the peripheral magnetic field sensing unit and producing frequencies corresponding to each direction, a correction amount computing unit for computing each correction amount corresponding to the frequencies of each direction produced by the frequency producing unit; and a deflection correction unit for correcting a deflection error of the monitor as much as the corrected amount in the correction amount computing unit. By having such construction, a screen is automatically corrected by sensing a peripheral magnetic field with a small memory capacity, thereby attaining users' convenience in correcting an earth magnetic field and maintaining an optimum picture quality.

7 Claims, 7 Drawing Sheets

| MODE | EARTH MAGNETIC FIELD CORRECTION SIGNAL | | | TRANSISTOR | | | | | | | DIRECTION |
|---|---|---|---|---|---|---|---|---|---|---|---|
| | S3 | S4 | S5 | Q3 | Q4 | Q5 | Q6 | Q2 | Q7 | Q8 | |
| MODE0 | L | L | L | OFF | X | OFF | X | X | ON | ON | STANDARD DIRECTION |
| MODE1 | H | L | L | OFF | ON | ON | OFF | OFF | ON | OFF | A |
| MODE2 | H | L | | OFF | ON | ON | OFF | ON | ON | OFF | B |
| MODE3 | L | H | L | ON | OFF | OFF | ON | OFF | OFF | ON | C |
| MODE4 | L | H | H | ON | OFF | OFF | ON | ON | OFF | ON | D |

APPARATUS FOR AUTOMATICALLY CORRECTING FOR EARTH MAGNETIC FIELD EFFECTS ON A MONITOR

BACKGROUND OF THE INVENTION

1. Field of the Invention

The present invention relates to a correction of earth magnetic field for a monitor of a computer, and more particularly, to an apparatus for automatically correcting an earth magnetic field for a monitor by which a correction of an earth magnetic field is automatically performed to thereby obtain a highly improved picture quality with distinct colors and an improved screen centering.

2. Description of the Background Art

In general, a magnetic field in a space is represented by a three dimensional vector, which affects a deflection of a monitor of a computer.

Accordingly, if a direction of the monitor is changed or the monitor is moved to other area, a peripheral magnetic field is changed, causing a damage to the picture quality of the monitor.

In order to resolve such a problem, some techniques for correcting an earth magnetic field has been proposed, which guarantees a distinct picture quality of the monitor Of those are a Korean patent publication No. 96-16849 and a Korean Laid Open No. 95-24598.

Figure 1:
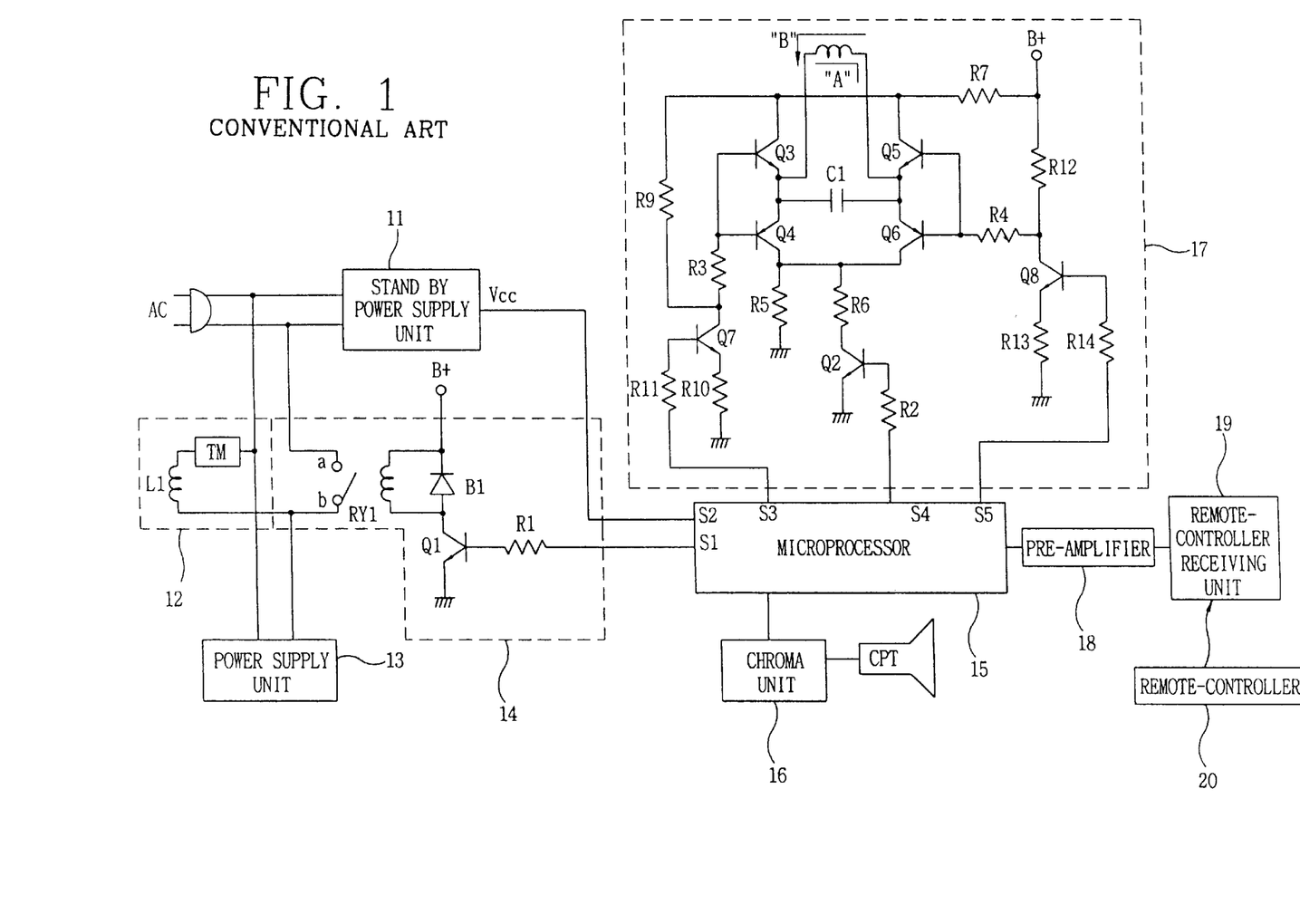
FIG. 1 is a circuit diagram of an apparatus for correcting an earth magnetic field in accordance one example of a conventional art.

First, one of conventional arts, the patent publication No. 96-16849 discloses an apparatus for correcting an earth magnetic field including: a standby power supply unit 11 for outputting a constant voltage Vcc as power is supplied; a remote controller 20 for setting an operation state of a TV system and selecting an earth magnetic field correction mode; a remote-controller receiving unit 19 for receiving a transmission signal of the remote-controller 20; a pre-amplifier 18 for amplifying the output signal from the remote-controller receiving unit 19 to a predetermined level; a microprocessor 15 for decoding the output signal from the pre-amplifier 18 and outputting an on-screen display indicating a compass direction of a corresponding mode for setting a correction mode and a signal for controlling the corresponding mode when the earth magnetic field correction function is selected, upon receipt of the output Vcc from the standby power supply unit 1; a chroma unit 16 for indicating the compass direction according to the setting of the correction mode of the CPT (color picture tube) upon receipt of the output signal from the microprocessor 15; a current switching unit 14 for switching on and switching off a current flow of a device coil 12 according to a relay drive signal S1 of the microprocessor 15; and an earth magnetic field correction unit 17 for controlling the direction and the strength of the current according to mode signals S3–S5 of the microprocessor 15 to minimize influence of the earth magnetic field.

The current switching unit 14 includes a transistor Q1 and a relay RY1.

The earth magnetic field correction unit 17 includes transistors Q7 and Q8 of which an emitter is grounded through resistances R10 and R13 and a base is connected to output terminals S3 and S5 of the microprocessor 15 through resistances R11 and R14, a transistor Q2 of which an emitter is grounded and a base is connected to an output terminal S4 of the microprocessor 15 through a resistance R2, transistors Q3, Q4, Q5 and Q6 of which each base is commonly connected to a terminal at one end of each resistance R3 and R4 and each emitter is commonly connected and an earth magnetic field correction coil L2 and a condensor C1 are respectively connected between the contact points, transistors Q3 and Q5 of which collectors are commonly connected and its contact point is connected to a voltage B+through a resistance R7 and the collector of the transistor Q7 and a terminal at other end of the resistance R3 are commonly connected through the resistance R9, and a collector of the transistor Q8 is connected to a terminal at the other end of the resistance R4 and its contact point is connected to the voltage B+through the resistance R12, and transistors Q4 and Q6 of which collectors are commonly connected and its contact point is grounded through a resistance R5, a resistance R6 is connected to the collector of the transistor Q2 through a resistance R6.

The remote-controller 20 includes a compass to identify a direction of the TV position, for the purpose of correcting the earth magnetic field.

Figure 2A:
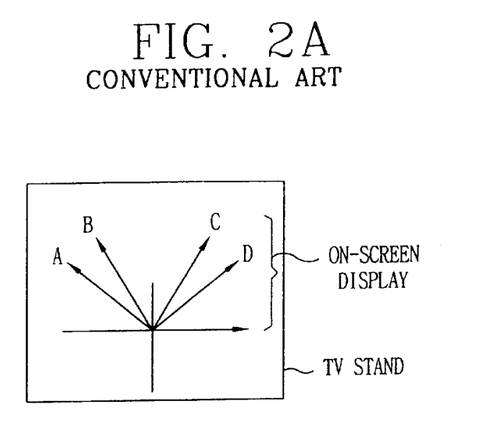
FIG. 2 is exemplary views of on-screen display in correcting an earth magnetic field of FIG. 1 in accordance with one example of the conventional art.
Figure 2B:
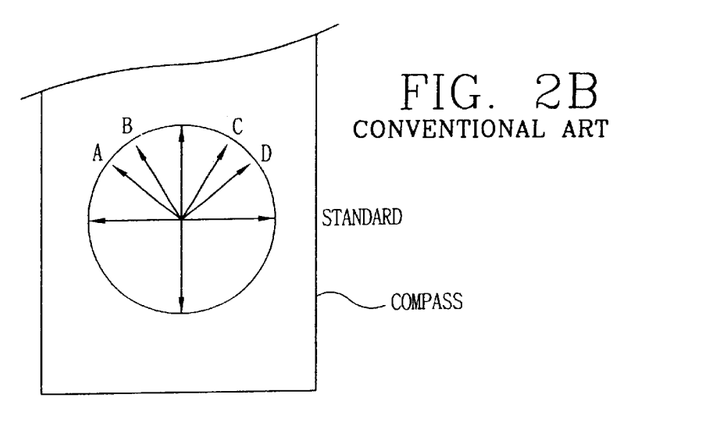

The operational process of the apparatus for correcting an earth magnetic field in accordance with the conventional art will now be described with reference to FIGS. 2 through 4.

First, when the power is ON, the standby power supply unit 11 outputs the constant voltage Vcc to the input terminal S2 of the microprocessor 15, and accordingly, the microprocessor 15 in a standby state checks the output signal of the pre-amplifier 18.

At this time, when the power key is in an OFF-state, the microprocessor 15 outputs the relay drive signal S1 to the current switching unit 14 to turn off the transistor Q1 to thereby turn off the relay RY1, and also outputs the earth magnetic field correction signals S3–S5 of low voltage to maintain OFF-state of the system.

And, when a power key is inputted from the remote-controller by the user, the transmission signal of the remote-controller 20 is received by the remote-controller receiving unit 19, and the received signal is amplified by the preamplifier 18 to a predetermined level and then outputted to the microprocessor 15.

Upon receipt of the output signal from the pre-amplifier 18, when the microprocessor 15 discriminates the input of the power supply key by decoding and outputs the relay drive signal S1 to the current switching unit 14, the transistor Q1 is turned on to drive the relay RY1, according to which the contact points 'a' and 'b' are connected and power is supplied to the power supply unit 13, so that the device coil 12 controls the current flow.

In other words, when the power is ON, a current flows through a thermister TH and the coil L1 of the device coil 12, and as time goes by, since a resistance value is increased according to temperature characteristics of the thermister TH, and thus, few current flows through the coil L1, the magnetic field of the monitor is degaussed.

Meanwhile, when the power is ON, the microprocessor 15 discriminates whether or not the earth magnetic field correction key was selected. In this respect, if there is no key selection, it returns to the initial step of the operation, while if the earth magnetic field correction key is selected by the remote-controller 20 by the user, the microprocessor 15 senses the key input through the remote-control receiving unit 19 and the pre-amplifier 18 and performs decoding. The microprocessor discriminates the selection of the earth magnetic field correction function by this decoding.

As the microprocessor 15 discriminates the selection of the earth magnetic field correction function by decoding the output signal from the preamplifier 18, it outputs a compass direction indication signal OSD to the chroma unit 16. Then, an on-screen display is displayed on a CPT (color picture tube) screen, and the user selects a corresponding key of the remote-controller 20 after ascertaining a direction of the TV position by using the compass attached on the remote-controller 20, so that a mode corresponding to the direction of the TV set position can be set by shifting the earth magnetic field correction mode one step by one step.

That is, as the user presses down the earth magnetic field correction mode setting key of the remote-controller 20 after ascertaining the direction of the TV position, the microprocessor 15 outputs the on-screen display signal OSD of the corresponding mode to the chroma unit 16, so that the on-screen display according to each mode is sequentially displayed on the screen of the CPT In this respect, at the time when the on-screen display identical to the direction of the TV position as identified by the compass attached on the remote-controller 20 is displayed, the user selects a set key to set a corresponding mode.

For example, if the TV set is turned aside 30° ('A' direction) from a standard direction, the earth magnetic field setting an on-screen display direction is set to be 'A' direction after the earth magnetic field correction mode is selected.

When the setting of the earth magnetic field correction mode is completed, the microprocessor 15 outputs the earth magnetic field correction signals S3, S4 and S5 according to the corresponding modes as set, to the earth magnetic field correction unit 17.

In detail, in case that the direction of the TV set position is identified as a standard direction and 'Mode0' is selected, since the microprocessor 15 outputs only earth magnetic field correction signals S3 and S5 of high voltage to the earth magnetic field correction unit 17, the transistors Q7 and Q8 are turned on while the transistors Q3 and Q5 are turned off. Then, since the current does not flow through the earth magnetic field correction coil L2, earth magnetic field correction is not performed.

Meanwhile, in case that the direction of the TV set position is identified as 'A' direction and 'Mode1' is selected, since the microprocessor 15 outputs only the earth magnetic field correction signal S3 of high voltage, the transistors Q4, Q5 and Q7 of the earth magnetic field correction unit 17 are turned on, so that a little current flows in the 'A' direction (that is, B+→R7→Q5→L2→Q3→R5), thereby correcting the degaussed state.

If the earth magnetic field correction mode is changed to be set by 'Mode2' from 'Mode1', the direction of the TV set position is identified as a 'C' direction, so that the microprocessor 15 outputs the earth magnetic field correction signals S3 and S4 of high voltage. Then, the transistors Q2, Q4, Q5 and Q7 of the earth magnetic field correction unit 17 are turned on, so that the current flowing through the resistance R5 also flows through the resistance R5 and the transistor Q2, thereby increasing the amount of the current (the flow of current: B+→R7→Q5→L2→Q4→R6→Q2).

If the earth magnetic field correction mode is set by 'Mode3', the direction of the TV set position is identified as the 'C' direction, so that the microprocessor 15 outputs the earth magnetic field correction signals S4 and S5 of high voltage. Then the transistors Q2 and Q8 are turned on, and thus, the transistors Q3 and Q6 are accordingly turned on, according to which a large amount of current flows in the 'B' direction (B+→R7→Q3→L2→Q6→R6→Q2), thereby correcting the degaussed state.

If the earth magnetic field correction mode is set by 'Mode4', the direction of the TV set position is identified as a 'D' direction, so that the microprocessor 15 outputs only the earth magnetic field correction signal S5 of high voltage. Then, the transistor Q8 of the earth magnetic field correction unit 17 is turned on and the transistors Q3 and Q6 are accordingly turned on, so that a little current flows in the 'B; direction (B+→R7→Q3→L2→Q6→R5)

Figure 3:
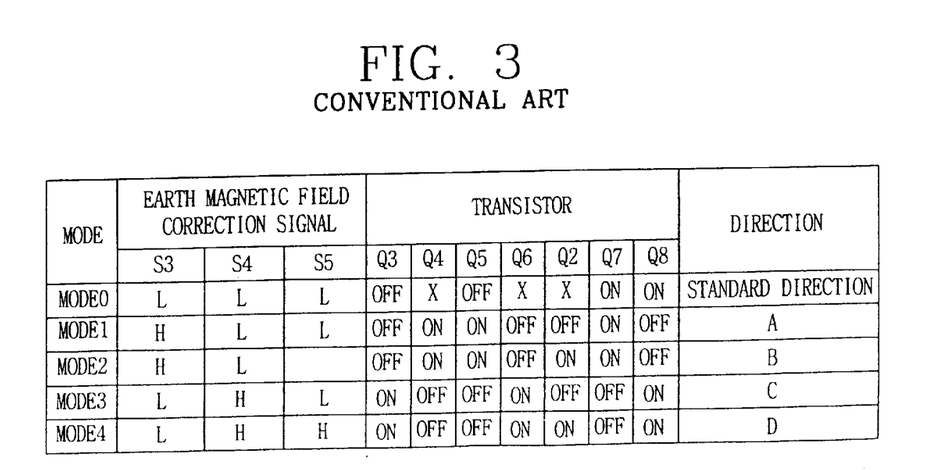
FIG. 3 shows a table for correcting the earth magnetic field of FIG. 1 in accordance with one example of the conventional art.
Figure 4:
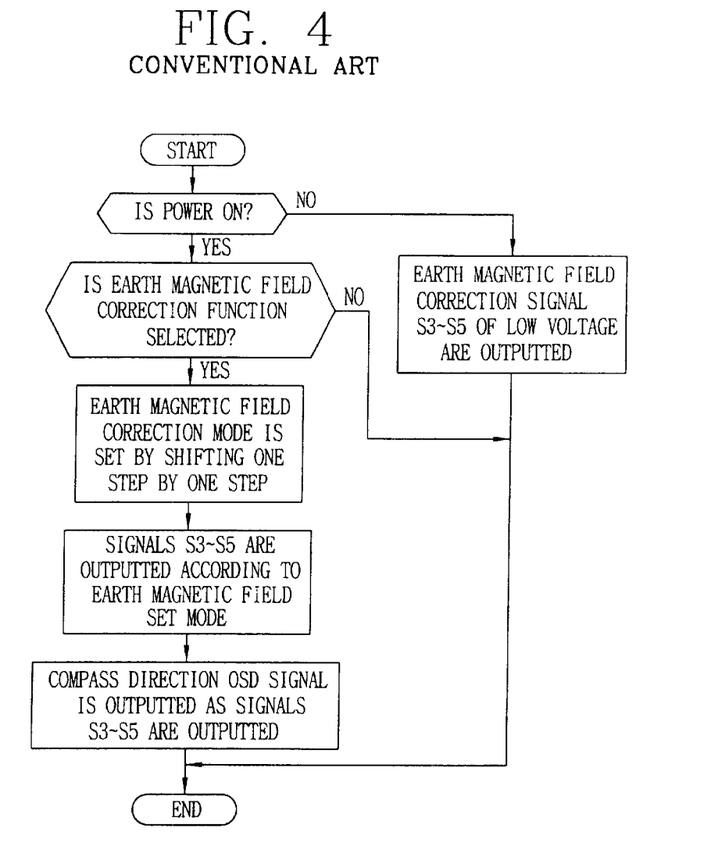
FIG. 4 is a flow chart of an operation for correcting the magnetic field of FIG. 1 in accordance with one example of the conventional art.

The state of the earth magnetic field correction unit 17 at the time when the microprocessor 15 outputs the earth magnetic field correction signals S3–S5 according to setting of the earth magnetic field correction mode is shown in FIG. 3.

That is, in this example of the conventional art, the earth magnetic field correction mode is selected depending on the direction of the TV set position, and according to which when a corresponding mode is set, the earth magnetic field is automatically corrected, thereby providing images of distinct colors.

Figure 5:
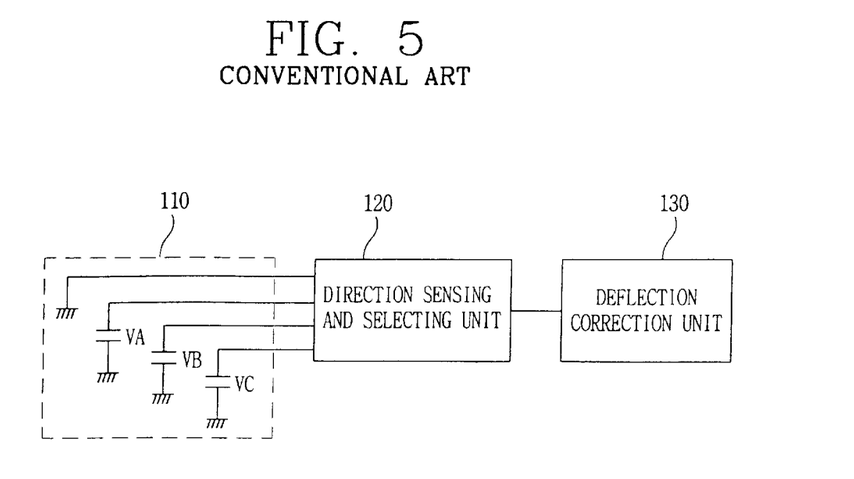
FIG. 5 is a schematic block diagram of a deflection correction apparatus of a cathode ray tube in accordance with another example of a conventional art.

Meanwhile, as another example of a conventional art shown in FIG. 5, the Korean Laid Open No. 95-24598 discloses a deflection correction apparatus of a cathode ray tube which includes a correction amount determining unit 110 having correction amount signals corresponding to each direction and outputting each correction amount signal; a direction sensing and selecting unit 120 for sensing a direction of the cathode ray tube and selectively outputting one of correction amount signals inputted from the correction amount determining unit 110 according to the sensing result; and a deflection correction unit 130 for correcting a deflection of the cathode ray tube according to the correction amount signal outputted from the direction sensing and selecting unit 120.

The direction sensing and selecting unit 120 includes a direction sensor for outputting a sensing result signal; and an output selecting switch for selectively outputting the correction amount signal of the correction amount determining unit 110 according to the sensing result signal.

The operation of the a deflection correction apparatus of a cathode ray tube according to the conventional art will now be described.

First, correction amount signals according to each direction are stored in the correction amount determining unit 110 at the time when the monitor is fabricated.

When an earth magnetic field correcting mode is set at the time when the monitor is placed, the direction sensor of the direction sensing and selecting unit 120 senses the direction of the cathode ray tube, and the output selecting switch selects a signal corresponding to the sensing result amount correction amount signals outputted from the correction amount determining unit 110 and then outputs it to the deflection correction unit 130.

Then, the deflection correction unit 130 corrects the deflection of the cathode ray tube corresponding to the correction amount signal selectively outputted from the direction sensing and selecting unit 120, thereby providing a good quality of distinct color image.

However, as to the former conventional technique as described above, since the direction of the area for the placement of the monitor is to be first identified by the compass and then the earth magnetic field correction mode is selected corresponding to the direction as identified, many correction mode data need to be stored for correcting the earth magnetic field precisely, resulting in that it requires a large memory which inevitably causes an increase of a unit cost of production.

Also, as to the latter conventional technique as described above, since the earth magnetic field is different in each area, it has the same problem as that of the former conventional technique to correct the earth magnetic field for each area.

SUMMARY OF THE INVENTION

Therefore, an object of the present invention is to provide an apparatus for automatically correcting an earth magnetic field for a monitor in which a screen is automatically corrected by sensing a peripheral magnetic field with a small memory capacity, thereby attaining users' convenience in correcting an earth magnetic field and maintaining an optimum picture quality.

To achieve these and other advantages and in accordance with the purposed of the present invention, as embodied and broadly described herein, there is provided an apparatus for automatically correcting an earth magnetic field for a monitor including: a peripheral magnetic field sensing unit for sensing a variation of a magnetic field and generating a corresponding frequency; a frequency producing unit for arithmetically operating the frequency generated from the peripheral magnetic field sensing unit and producing frequencies of each direction; a correction amount computing unit for computing each correction amount corresponding to each frequency of each direction produced by the frequency producing unit; and a deflection correction unit for correcting a deflection error of the monitor as much as the corrected amount in the correction amount computing unit.

The correction amount computing unit converts the frequency of the frequency producing unit to a magnetic field value according to a pre-stored frequency-magnetic correlative equation, and compares it with a pre-set reference magnetic field value to thereby compute a correction amount corresponding to a difference thereof.

The correction amount computing unit includes a microprocessor having a programmable memory in which a frequency-magnetic field correlative equation and a magnetic field-screen change correlative equation are stored to correct a tile, a vertical position, a horizontal position and a purity landing, and a storing unit (EEPROM) for storing an initial screen data and a reference magnetic field value of each direction.

There is also provided a method for automatically correcting an earth magnetic field for a monitor including the steps of: setting reference magnetic field values corresponding to three axes of X, Y and Z; measuring a magnetic field of the directions of the three axes; discriminating whether or not the reference magnetic field value in the reference magnetic field value setting step and the measured magnetic field in the magnetic field measuring step are identical to each other; maintaining a tilt, a vertical position, a horizontal position and a purity if the reference magnetic field value and the measured magnetic field in the discriminating step are identical; and determining a correction amount by using a predetermined equation and correcting a tile, a vertical position, a horizontal position and a purity if the reference magnetic field value and the measured magnetic field value in the discriminating step are not identical.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The operation of the apparatus for automatically correcting the earth magnetic field of a monitor in accordance with the present invention now be described with reference to FIGS. 7 through 11 c.

Figure 7:
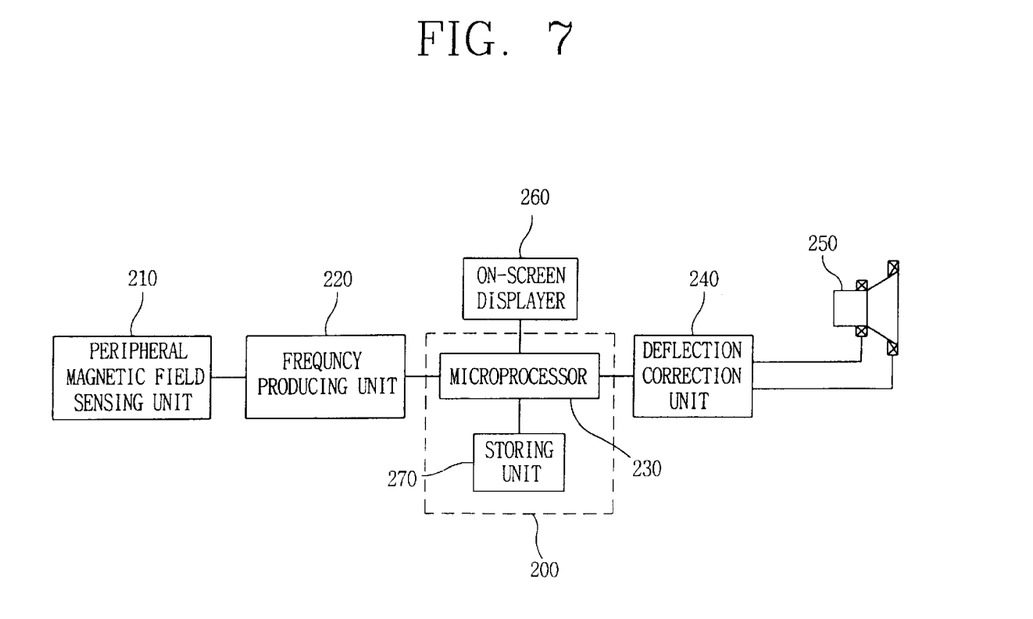
FIG. 7 is a schematic block diagram of an apparatus for automatically correcting an earth magnetic field for a monitor in accordance with the present invention.

FIG. 7 is a schematic block diagram of an apparatus for automatically correcting an earth magnetic field for a monitor in accordance with the present invention, which includes a peripheral magnetic field sensing unit 210 for combining a magnetic field sensor and a resistance both in a magneto inductive mode to apply a forward direction current and a reverse direction current, and generating a frequency according to a variation in a magnetic field generated at that time; a frequency producing unit 220 for arithmetically operating a difference (X_for–X_rev, Y_for–Y_rev, Z_for–Z_rev) between a forward direction frequency (X_for, Y_for and Z_for) and a reverse direction frequency (X_rev, Y_rev and Z_rev) and producing frequencies (fx, fy and fz) of each direction; a microprocessor 230 for operating the frequencies (fx, fy and fz) of each direction of the frequency producing unit 220 to convert them to magnetic field values (Gx, Gy and Gz) of each direction when an on-screen display key 260 is inputted and an earth magnetic field correction mode is set, and comparing the magnetic field values (Gx, Gy and Gz) of each direction with reference magnetic field values (G_Xref, G_Yref and G_Zref) to compute a correction amount corresponding to the difference; a deflection correction unit 240 for correcting a deflection of a monitor (250) as much as the correction amount at the microprocessor 230; and a storing unti 270 for pre-storing reference magnetic field values (G_Xref, G_Yref and G_Zref) for computing the correction amount, and an initial screen data (i.e., tile, Vpos, Hpos and purity, etc.) of a screen pre-set at the time when the monitor is fabricated, so as to provide them to the microprocessor 230.

Figure 8:
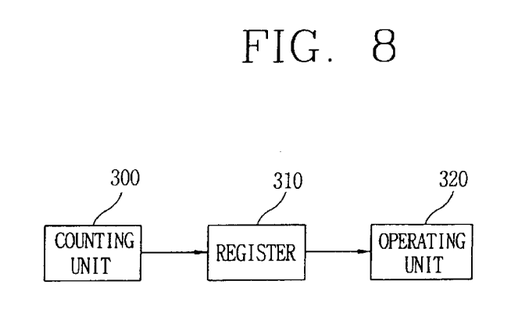
FIG. 8 shows an internal construction of a frequency producing unit of FIG. 7 in accordance with the present invention.

FIG. 8 shows an internal construction of a frequency producing unit of FIG. 7 in accordance with the present invention, which includes a counter 300 for sequentially counting the forward direction frequency and the reverse direction frequency; a register 310 for temporarily storing the value counted at the counter; and an operating unit 320 for computing the difference between the forward direction frequency and the reverse direction frequency and producing frequencies of each direction by using the difference.

The magnetic field sensor provided at the peripheral magnetic field sensing unit 210 is installed parallel to a magnetic field of each axis direction.

The microprocessor 230 includes a programmable memory for storing a frequency-magnetic field correlative equation (EQ1x, EQ1y and EQ1z) and a magnetic field-screen variation correlative equation.

The storing unit 270 includes an EEPROM.

The operation of the apparatus for automatically correcting the earth magnetic field of a monitor constructed as described above will now be explained.

A magnetic field in a space can be represented by a three-dimensional vector having three directions and sizes of X, Y and Z.

Figure 6:
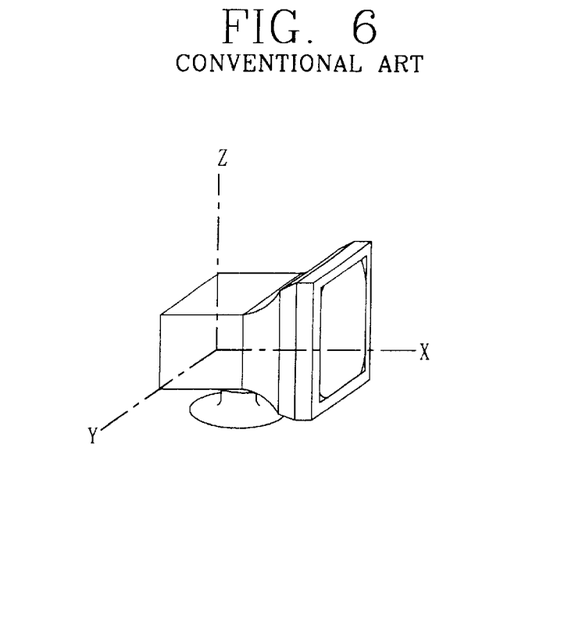
FIG. 6 is an exemplary view of general direction of a magnetic field in accordance with another example of the conventional art.

As shown in FIG. 6, in the present invention, the magnetic field of each screen direction (X, Y and Z) of the monitor is defined as X-axis direction magnetic field Gx, Y-axis direction magnetic field Gy and Z-axis direction magnetic field Gz.

First, the peripheral magnetic field sensing unit 210 is oscillated by combining a resistance and a sensor both in a magneto inductive mode that an inductance is varied relying on a variation in a peripheral magnetic field.

At this time, in the peripheral magnetic field sensing unit 210, in order to prevent any malfunction possibly caused by a drift according to a temperature change, the forward direction current and the reverse direction current flow in turn to the sensor in each axis direction so as for the peripheral magnetic field sensing unit 210 to be resonated, so that the forward direction frequencies (X_for, Y_for and Z_for) and the reverse direction frequencies (X_rev, Y_rev and Z_rev) are generated.

Accordingly, the frequency producing unit 220 counts the forward direction frequencies (Xfor, Y_for and Z_for) and the reverse direction frequencies (X_rev, Y_rev and Z_rev) generated at the peripheral magnetic field sensing unit 210, stores them to its internal register, computes the difference (X_for−X_rev, Y_for−Y_rev and Z_for−Z_rev) between the forward direction frequencies and the reverse direction frequencies, produces the final frequencies (fx, fy and fz) by using the difference, and transfers it to the microprocessor 230.

Figure 9:
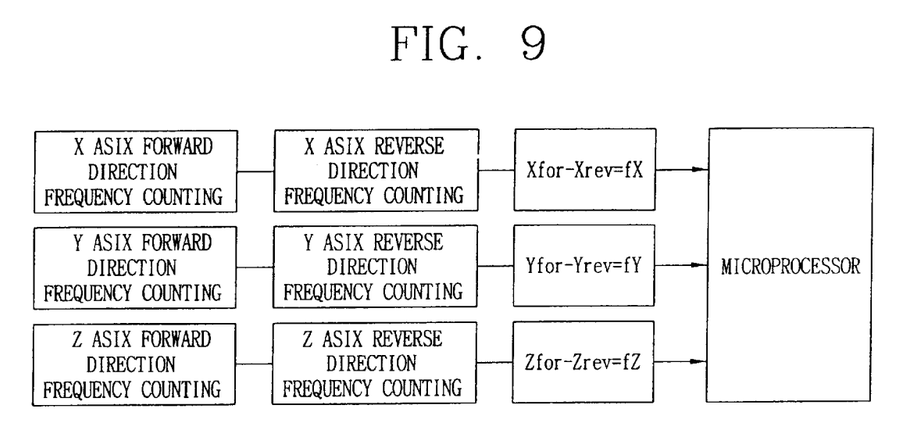
FIG. 9 is an exemplary view of an operation of the frequency producing unit of FIG. 7 in accordance with the present invention.

The frequency producing unit 220 produces the frequencies (fx, fy and fz) of each direction according to the process of FIG. 9 and includes, as shown in FIG. 8, a counter 300 for sequentially counting the forward direction frequencies (X_for, Y_for and Z_for) and the reverse direction frequencies (X_rev, Y_rev and Z_rev) of each direction (X, Y and Z); a register 310 for storing the forward direction frequencies (X_for, Y_for and Z_for) and the reverse direction frequencies (X_rev, Y_rev and Z_rev) as counted; and an operating unit 320 for computing the difference (X_for−X_rev, Y_for−Y_rev and Z_for−Z_rev) between the forward direction frequencies and the reverse direction frequencies and producing the frequencies (fx, fy and fz) of each direction by using the difference.

Figure 10:
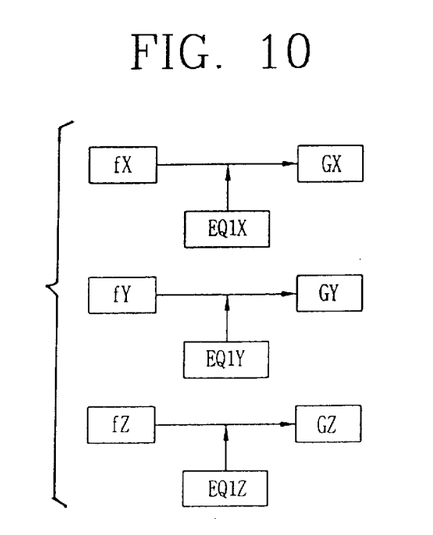
FIG. 10 is an exemplary view of a conversion from a frequency to a magnetic field of FIG. 7 in accordance with the present invention.

At this time, when the earth magnetic field correction mode is set after the on-screen display key 260 is inputted, as shown in FIG. 10, the microprocessor 230 converts the frequencies (fx, fy and fz) of each axis transferred from the frequency producing unit 220 to magnetic fields (Gx, Gy and Gz) according to each frequency (f)-magnetic field(G) correlative equation (EQ1x, EQ1y and EQ1z).

The frequency (f)-magnetic field(G) correlative equations (EQ1x, EQ1y and EQ1z) are those pre-set in the microprocessor 230, each of which is obtained as follows: Taken as an example of a frequency of X axis-magnetic field correlative equation (EQ1x), after '0.5G' is arranged in the X-axis direction, its output frequency is measured and an output frequency at '−0.5G' is obtained. Then a straight line between the frequency (f) and the magnetic field (Gx) can be formed by using the obtained two output frequency values, by which a first equation of the straight line can be obtained.

The frequency-magnetic field correlative equation (EQ1x, EQ1y and EQ1z) can be expressed as follows:

$$EQ1x = Afx+B,\ EQ1y = Cfy+D,\ EQ1z = Efz+F, \text{ where } EQ1x,\ EQ1y$$

and EQ1z respectively indicate a magnetic field (Gx, Gy and Gz) (Gauss) of each X, Y and Z direction, and A~F are a constant.

At this time, as shown in FIG. 10, the microprocessor 230 keeps comparing whether the reference magnetic fields (G_Xref, G_Yref and G_Zref) as pre-set in the EEPROM in the fabricating stage of the monitor and the currently sensed magnetic fields (Gx, Gy and Gz) are identical, so as to judge whether or not the screen state is to be corrected.

If the reference magnetic fields and the currently sensed magnetic fields are identical, the microprocessor 230 operates the deflection correction unit 240 to maintain the current screen state of the monitor 250.

On the other hand, if the reference magnetic fields are not identical to the currently sensed magnetic fields, the microprocessor 230 recognizes the axis direction in which the magnetic field is changed so as to determine a correction amount according to a magnetic field-screen change correlative equation (EQ2_Tilt, EQ2_Vpos and EQ2_Hpos) pre-set for the corresponding axis direction.

The pre-set magnetic field-screen change correlative equation for each axis direction is obtained by a first equation over a screen direction change for a magnetic field.

For example, in case of the tilt, the following equation is obtained.

EQ2_Tilt=AGx+B, where EQ2_Tilt is a tilt correction amount [mm], Gx is an X axis direction magnetic field [Gauss], and 'A' and 'B' are a constant.

In case of correction of the tilt, when a correction amount is determined by a screen-magnetic field change correlative equation, the microprocessor 230 adjusts a duty width of a PMM pulse for adjusting the tilt as much as the correction amount and transfers it to the deflection correction unit 240, so that the current of a tilt coil is changed, and the tilt is accordingly corrected.

Likewise, the screen-magnetic field change correlative equation (EQ2-Vpos and EQ2_Hpos) for correcting the vertical position and the horizontal position can be obtained by following equation:

$$EQ2\_Vpos = CGy+D,\ EQ2\_Hpos = EGz+F,$$

where EQ2_Vpos is a vertical position correction amount, Eq2_Hpos is a horizontal position correction amount, and C~F are a constant.

Accordingly, in case of the correction of the vertical position and the horizontal position, like the tilt correction process, the microprocessor 230 computes the correction amount, adjusts the duty width of the PWM pulse for adjusting the vertical position and the horizontal position as much as the correction amount, and transfers it to the deflection correction unit 240, so that the current of a vertical position coil and a horizontal position coil is changed, and accordingly the vertical position and the horizontal position are corrected.

After the correction amount of the horizontal position, vertical position and the tilt as state above, a purity correction is performed by controlling a beam landing at four corners of the screen of the monitor 250.

Figure 11A:
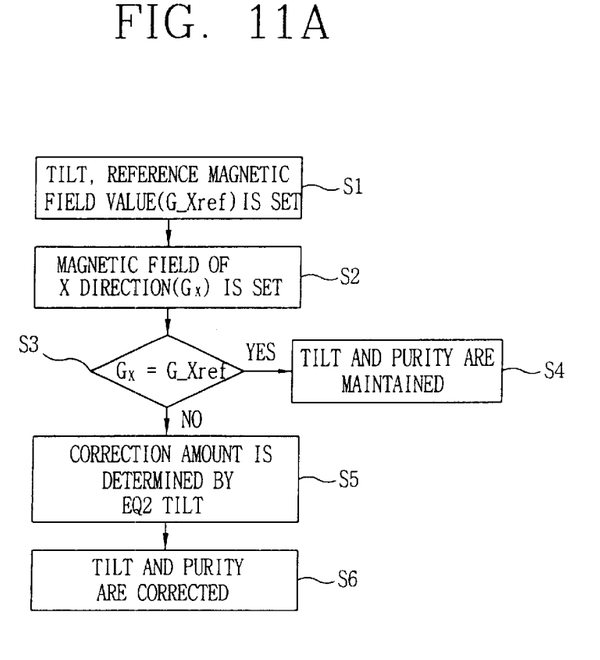
FIGS. 11a, 11b and 11c are flow charts of operations for sensing a variation in a magnetic field and its correction of FIG. 7 in accordance with the present invention.
Figure 11B:
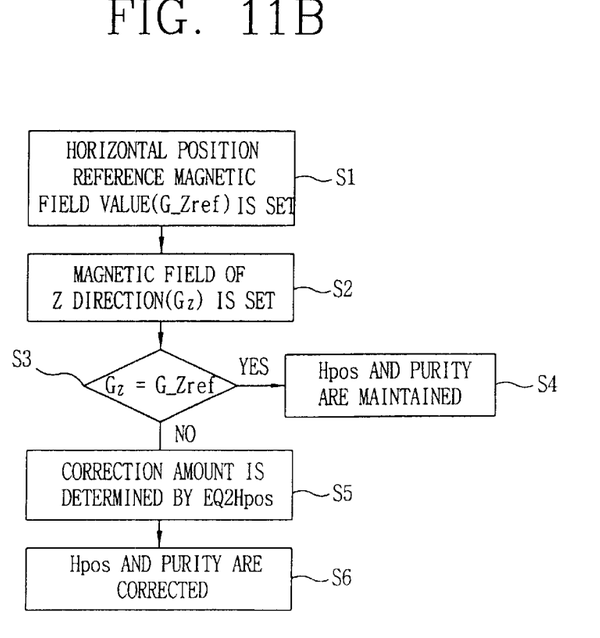
Figure 11C:
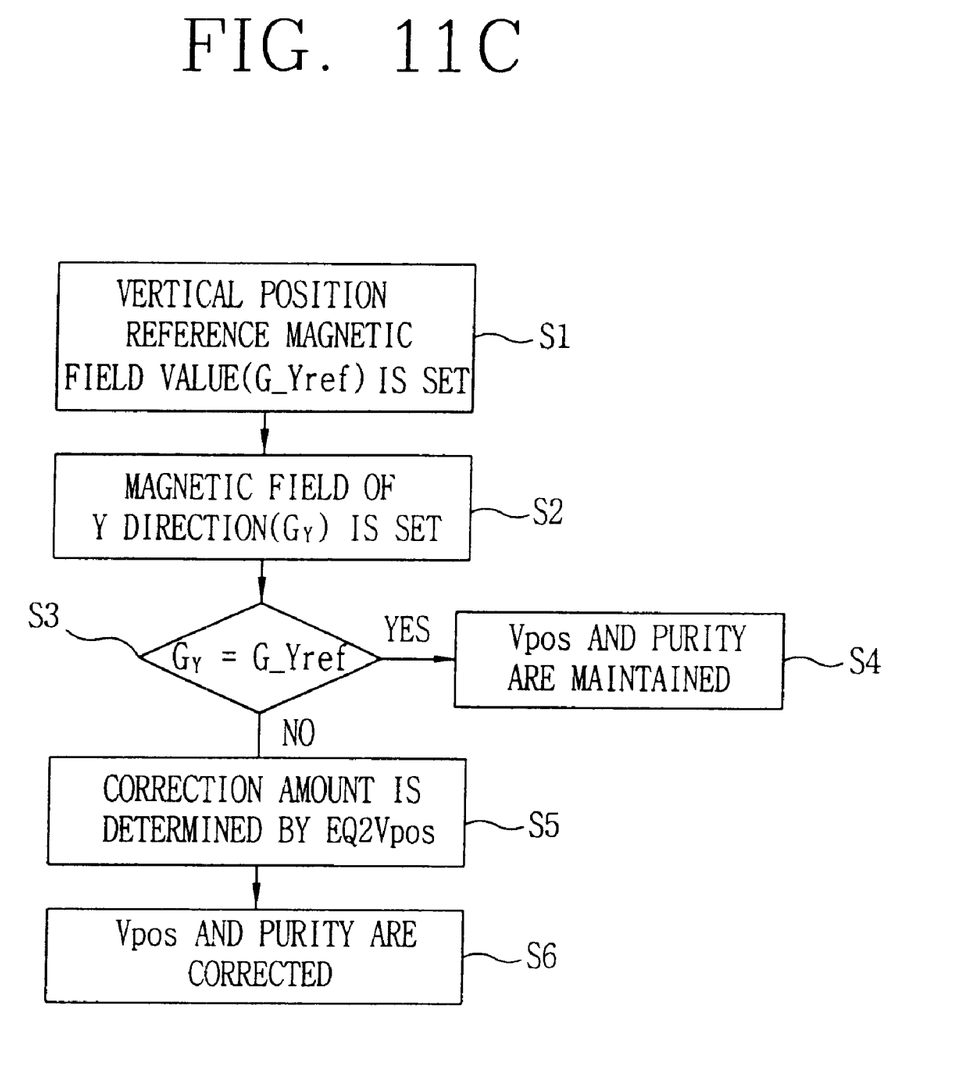

FIGS. 11a, 11b and 11c are flow charts of operations for sensing a variation in a magnetic field and its correction of FIG. 7 in accordance with the present invention.

FIG. 11a is a flow chart of an operation for sensing and correcting a magnetic field variation of X direction. First, a Tilt reference magnetic field value (G_Xref) of X direction is set in a step S1, and a magnetic field (Gx) of the X direction in a step S2. Then, it is judged whether or not the tilt reference magnetic field value (G_Xref) is identical to the magnetic field value (Gx) of the X direction, and if the two are identical, the tilt and the purity is maintained in a step S4, while if the two are not identical, a correction amount is determined by the equation EQ2_tilt in a step S5, thereby correcting the tilt and the purity in step S6.

FIG. 11b is a flow chart of an operation for sensing and correcting a magnetic field variation of Y direction. First, a vertical position reference magnetic field value (G_Yref) of Y direction is set in a step S1, and a magnetic field (Gy) of the Y direction is measured in a step S2. Then, it is judged whether or not the vertical position reference magnetic field value (G_Yref) is identical to the magnetic field value (Gy), and if the two are identical, the Vpos and the purity are maintained in a step S4, while if the two are not identical, a correction amount is determined by the equation of EQ2_Vpos in a step S5, thereby correcting the Vpos and the purity in a step S6.

FIG. 11c is a flow chart of an operation for sensing and correcting a magnetic field variation of Z direction. First, a horizontal position reference magnetic field value (G_Zref) of Z direction is set in a step S1, and a magnetic field (Gz) of Z direction is measured in a step S2. Then, it is judged whether or not the vertical position reference magnetic field value (G_Zref) is identical to the magnetic field value (Gz) of Z direction in a step S3, and if the two are identical, the Hpos and the purity are maintained in a step S4, while if the two are not identical, a correction amount is determined by the equation of EQ2_Hpos, thereby correcting the Hpos and the purity.

As so far described, according to the apparatus for automatically correcting the earth magnetic field of the monitor of the present invention, when the earth magnetic field correction mode is set, a peripheral magnetic field is detected and magnetic field correction amount of each direction is automatically computed, so as to correct the magnetic field as much as the correction amount, thereby attaining users' convenience and improving a reliability of the product.

Also, since the size of the memory can be reduced, its unit cost of production can be much reduced accordingly.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for automatically correcting for earth magnetic field effects on a monitor, the apparatus comprising:

a peripheral magnetic field sensing unit for sensing a variation in a magnetic field and generating a corresponding frequency;

a frequency producing unit for computing a difference between a forward direction frequency and a reverse direction frequency corresponding to the magnetic field in each direction from an output of the peripheral magnetic field sensing unit and producing frequencies of each direction;

a correction amount computing unit for computing a correction amount corresponding to the frequencies produced by the frequency producing unit; and a deflection correction unit for correcting a deflection offset of the monitor by the corrected amount from the correction amount computing unit.

2. The apparatus according to claim 1, wherein the frequency producing unit includes:

a counter for sequentially counting the forward direction frequency and the reverse direction frequency;

a register for temporarily storing the value counted at the counter; and an operating unit for computing the difference between the forward direction frequency and the reverse direction frequency and producing frequencies of each direction by using the difference.

3. The apparatus according to claim 1, wherein the correction amount computing unit includes:

a microprocessor for operating frequencies of each direction produced by the frequency producing unit, converting them to a magnetic field value of each direction, comparing the magnetic field value of each direction with a reference magnetic field value, and computing a correction amount corresponding to a difference thereof; and a storing unit for pre-storing a reference magnetic field value for the computation of the correction amount and providing it to the microprocessor.

4. The apparatus according to claim 1, wherein the correction amount computing unit computes a beam landing correction amount on the basis of a magnetic field variation of a horizontal position or a vertical position.

5. A method for automatically correcting for earth magnetic field effects on a monitors comprising the steps of:

setting a reference magnetic field value corresponding to three axes of X, Y and Z;

measuring a magnetic field of the directions of the three axes;

discriminating whether or not the reference magnetic field value in the reference magnetic field value setting step and the measured magnetic field in the magnetic field measuring step are identical to each other;

maintaining a tilt, a vertical position, a horizontal position and a purity, if the reference magnetic field value and the measured magnetic field in the discriminating step are identical; and determining a correction amount by using a predetermined equation and correcting a tilt, a vertical position, a horizontal position and a purity, if the reference magnetic field value and the measured magnetic field value in the discriminating step are not identical.

6. The method according to claim 5, wherein the predetermined equation is $AGx+B$ and/or $CGy+D$ and/or $EGz+F$.

7. The apparatus of claim 3, wherein the correction amount computing unit computes a beam landing correction amount on the basis of a magnetic field variation of a horizontal position or a vertical position.

* * * * *